United States Patent [19]
Rackow et al.

[11] Patent Number: 5,357,430
[45] Date of Patent: Oct. 18, 1994

[54] SYSTEM FOR TEXT TRANSLATION

[75] Inventors: Ulrike Rackow, Aachen; Ulrike Schwall, Munich, both of Fed. Rep. of Germany

[73] Assignee: International Business Machines Corporation, Armonk, N.Y.

[21] Appl. No.: 959,840

[22] Filed: Oct. 13, 1992

[30] Foreign Application Priority Data

Oct. 25, 1991 [DE] Fed. Rep. of Germany ....... 4135261

[51] Int. Cl.$^5$ .............................................. G06F 15/38
[52] U.S. Cl. .................... 364/419.08; 364/419.04
[58] Field of Search ............... 364/419, 419.02, 419.04, 364/419.05, 419.08

[56] References Cited

U.S. PATENT DOCUMENTS

| | | | |
|---|---|---|---|
| 4,672,571 | 6/1987 | Bass et al. | 364/DIG. 2 |
| 4,777,617 | 10/1988 | Frisch et al. | 364/419 |
| 4,873,634 | 10/1989 | Frisch et al. | 364/419 |
| 5,029,084 | 7/1991 | Morohasi et al. | 364/419 |
| 5,065,318 | 11/1991 | Kugimiya et al. | 364/419 |

FOREIGN PATENT DOCUMENTS 0281742 9/1988 European Pat. Off. .
0398513 11/1990 European Pat. Off. .

OTHER PUBLICATIONS

IBM J. Res. Develop., vol. 32, No. 2, Mar. 1988, "Spelling Assistance for Compound Words", by Rudolf Frisch et al., pp. 195–200.

European Search Report for IBM Docket No. GE991027 (Application No. 92115645.1) dated Jul. 14, 1993.

*Primary Examiner*—Roy N. Envall, Jr.
*Assistant Examiner*—Andrew Bodendorf
*Attorney, Agent, or Firm*—Arthur J. Samodovitz

[57] ABSTRACT

The invention concerns a text translation system, wherein the memory of a computer system stores the word type, the semantic type, a juncture code, a position code, a transfer code, as well as the associated translation into the target language for each word of the source language. By means of the juncture code and the position code, the compounds of the source language are decomposed into the words of which they consist. For these words the associated translations into the target language are read from the memory. The translations are then compounded following standard translation rules. For this purpose, translation peculiarities of compounds are taken into account by the transfer code. The invention eliminates storing compounds in the memory of the computer system. Instead, only the individual words of which the compounds consist are stored. This greatly reduces the memory space required for storing all the words of a source language and simultaneously increases the processing speed of the text translation system.

14 Claims, 4 Drawing Sheets

| P | DEFINITION | EXAMPLE |
|---|---|---|
| 01 | --- | Tisch > Tisch(bein) |
| 02 | Umlaut | Bruder > Brueder(gemeinde) |
| 03 | +e | Mund > Munde(futter) |
| 03 | +e+Umlaut | Gans > Gaense(fett) |
| 03 | +e | Maus > Mause(falle) |
| 04 | +en | Instanz > Instanzen(weg) |
| 04 | +en | Stern > Sternen(himmel) |
| 05 | +ens | Herz > Herzens(freund) |
| 05 | +ens | Schmerz > Schmerzens(geld) |
| 06 | +er | Geist > Geister(fahrer) |
| 06 | +er+Umlaut | Blatt > Blatter(wald) |
| 07 | +es | Geist > Geistes(blitz) |
| 08 | +ien | Prinzip > Prinzipien(reiter) |
| 09 | (-r)+n | Kranke (r) > Kranken(haus) |
| 10 | +n | Schwalbe > Schwalben(nest) |
| 11 | +nen | Drogistin > Drogistinnentreffen |
| 12 | +ns | Friede > Friedens(pfeile) |
| 13 | +s | Antritt > Antritts(besuch) |
| 13 | +s | Heizung > Heizungs(monteur) |
| 14 | -e | Wette > Wett(ruesten) |
| 15 | -en | Sueden > Sued(hang) |
| 16 | -e+s | Gebirge > Gebirgs(zug) |
| 17 | -en+s | Weihnachten > Weihnachts(konzert) |
| 18 | -n | Ostern > Oster(wetter) |
| 19 | -a+en | Madonna > Madonnen(kult) |
| 20 | -um+en | Museum > Museen(verwaltung) |
| 21 | -sse+B | Adresse > Adreβ(buch) |
| 22 | -us+en | Aphorismus > Aphorismen(sammlung) |
| 23 | -os+en | Mythos > Mythen(tradition) |
| 24 | -s+en | Heros > Heroen(kult) |
| 25 | -us+een | Kaktus > Kakteen(zucht) |
| 26 | +ten | Bau > Bauten(zaehlung) |
| 27 | -um+a | Arabikum > Arabika(preis) |

| 100 | 101 | 102 | 103 | 104 | 105 | 106 |
|---|---|---|---|---|---|---|
| WORD | WORD TYPE | SEMANTIC TYPE | JUNCTURE CODE | POSITION CODE P | TRANSFER CODE T | TRANS- LATION |

FIG.1

| 104 | 131 | 132 |
|---|---|---|
| P | DEFINITION | EXAMPLE |
| 1 | ON ITS OWN + ANYWHERE | ANTRITTS SCHULE |
| 2 | ON ITS OWN + AT THE END | |
| 3 | ON ITS OWN + (AT THE BEGINNING OR IN THE MIDDLE) | |
| 4 | ON ITS OWN + (AT THE END OR IN THE MIDDLE) | |
| 5 | ONLY AT THE END | |
| 6 | ONLY (AT THE BEGINNING OR IN THE MIDDLE) | OSTER |
| 7 | ONLY (AT THE END OR IN THE MIDDLE) | |
| 8 | ONLY ON ITS OWN | |

| P | DEFINITION | EXAMPLE |
|---|---|---|
| 01 | --- | Tisch > Tisch(bein) |
| 02 | Umlaut | Bruder > Brueder(gemeinde) |
| 03 | +e | Mund > Munde(futter) |
| 03 | +e+Umlaut | Gans > Gaense(fett) |
| 03 | +e | Maus > Mause(falle) |
| 04 | +en | Instanz > Instanzen(weg) |
| 04 | +en | Stern > Sternen(himmel) |
| 05 | +ens | Herz > Herzens(freund) |
| 05 | +ens | Schmerz > Schmerzens(geld) |
| 06 | +er | Geist > Geister(fahrer) |
| 06 | +er+Umlaut | Blatt > Blatter(wald) |
| 07 | +es | Geist > Geistes(blitz) |
| 08 | +ien | Prinzip > Prinzipien(reiter) |
| 09 | (-r)+n | Kranke (r) > Kranken(haus) |
| 10 | +n | Schwalbe > Schwalben(nest) |
| 11 | +nen | Drogistin > Drogistinnentreffen |
| 12 | +ns | Friede > Friedens(pfeife) |
| 13 | +s | Antritt > Antritts(besuch) |
| 13 | +s | Heizung > Heizungs(monteur) |

| 14 | -e | Wette > Wett(ruesten) |
| 15 | -en | Sueden > Sued(hang) |
| 16 | -e+s | Gebirge > Gebirgs(zug) |
| 17 | -en+s | Weihnachten > Weihnachts(konzert) |
| 18 | -n | Ostern > Oster(wetter) |
| 19 | -a+en | Madonna > Madonnen(kult) |
| 20 | -um+en | Museum > Museen(verwaltung) |
| 21 | -sse+B | Adresse > AdreB(buch) |
| 22 | -us+en | Aphorismus > Aphorismen(sammlung) |
| 23 | -os+en | Mythos > Mythen(tradition) |
| 24 | -s+en | Heros > Heroen(kult) |
| 25 | -us+een | Kaktus > Kakteen(zucht) |
| 26 | +ten | Bau > Bauten(zaehlung) |
| 27 | -um+a | Arabikum > Arabika(preis) |

FIG.2B

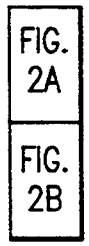

FIG.2

| WORD (100) | WORD TYPE (101) | SEMANT. TYPE (102) | F (103) | P (104) | T (105) | TRANSLATION (106) |
|---|---|---|---|---|---|---|
| PARLAMENT | N | ... | 13 | 1 | ADJ | PARLIAMENT<br>ADJ: PARLIAMENTARY |
| DEBATTE | N | ... | 10 | 1 | ... | DEBATE |
| SICHERHEIT | N | ... | 13 | 1 | PHYS/ABS | PHYS: SAFETY<br>ABS: SECURITY |
| GLAS | N | PHYS | 01 | 1 | ... | GLASS |

| GERMAN | ENGLISH |
|---|---|
| NOUN — NOUN | NOUN — NOUN<br>ADJECTIVE — NOUN<br>NOUN — OF — NOUN |
| ADJECTIVE — NOUN | ADJECTIVE — NOUN<br>NOUN — NOUN |
| VERB — NOUN | NOUN — NOUN<br>GERUND — NOUN |

SYSTEM FOR TEXT TRANSLATION

BACKGROUND OF THE INVENTION

The invention concerns a computer system for text translation, comprising memory means in which words and their associated translations are stored. The invention also concerns a method of text translation with the help of a computer system.

Text translation systems are known wherein a computer system proposes translations of single text words to a translator. In such equipment, the stored translations of the various text words are read by the computer system from the memory means and displayed, for example, on a screen to the translator. The translator may use the proposed translations but is still forced to combine them in the form of a translated text. Thus, the text translation system is a translator tool for the preparation of translations.

Text translation systems are also being marketed or under development which are aimed at fully automatic translation. In such text translation systems, the computer itself, following predetermined translation rules, also combines the translations read from memory to generate a translated text.

In both cases, it is essential to store the entire vocabulary of the source language along with the associated translations of the target language in the memory means. Where German is the source language of the text translation system, there is, regardless of the target language, the problem of entering the entire range of German compounds, i.e. any compound words of the German language, into the memory means. This necessitates storing not only the words "Tier", "Schutz", "Verein" but also compounds such as "Tierschutz", "Tierschutzverein", "Vereinskasse", "Schutzhuelle", etc. Consequently, only large computer systems with extensive memory means could be used as text translation systems, which in turn would lead to relatively slow processing speeds of the text translation system, as the entire memory means would have to be searched for each word to be translated. Finally, such a text translation system would be liable to errors, as the German language frequently produces new compounds which would then have to be stored in the memory means.

It is the object of the present invention to provide a text translation system which allows a fully automatic and correct translation of German compounds also on small computer systems.

SUMMARY OF THE INVENTION

In a computer system of the previously described kind this object is accomplished by additionally storing segmentation and translation aids for compound constituents.

For a method of text translation of the previously mentioned kind the invention provides for compounds to be decomposed into words by means of stored segmentation aids and for translations associated with such words to be generated on the basis of stored translation aids.

The segmentation aids allow the text translation system to decompose compounds into their constituents, i.e. single words. These words are addressable in the memory means and the associated translations may then be read out. It is no longer necessary to store the compound in its entirety but it is sufficient to file the compound constituents, i.e. the individual words, and their translations in the memory means. For the previously mentioned example it is thus sufficient to store the words "Tier", "Schutz", "Verein", etc. but not the compounds "Tierschutzverein", etc. This reduces the memory space required considerably. As a result, such text translation systems may also be run on small computers. In addition, the processing speed of the text translation system is increased.

The stored translation aids ensure that compounds are correctly translated. This is particularly important whenever the translation of a compound differs from standard translation rules.

It has been found, for example, that when translating from German into English, a German compound made up of two nouns also appears as two nouns in English in most cases. This is in compliance with standard translation rules. If the translation of a compound differs from those rules, meaning, for instance, if a German compound consisting of two nouns appears in English as an adjective and a noun, this deviation from the standard rules is stored as a translation aid for the corresponding word of the German compound to be taken into account for correct translation.

One embodiment of the invention provides for the translation aid to take the form of a transfer code to indicate that a word is translated in a special way in conjunction with compounds. This transfer code may denote, for example, another word type or construction to be considered for translation. According to another example, the transfer code may serve to indicate different translations of a word depending upon the other words contained in the compound.

Further embodiments of the invention provide for segmentation aids in the form of a connecting or juncture code and a position code; a further translation aid may be a table in which the composition of compound words is associated with that of the words of the translated compounds.

Still further advantageous embodiments of the invention are described below by way of an example illustrated in the accompanying drawings, in which:

BRIEF DESCRIPTION OF THE FIGURES

FIG. 1 shows an excerpt from a memory of a computer system, in which a word is stored along with the associated word and the semantic type, as well as the associated juncture, position and transfer codes, and the associated translation;

FIG. 2 shows a table defining the different juncture codes of FIG. 1;

FIG. 3 shows a table defining the different position codes of FIG. 1;

DETAILED DESCRIPTION OF THE PREFERRED EMBODIMENTS

Figures 4, 5, 6:
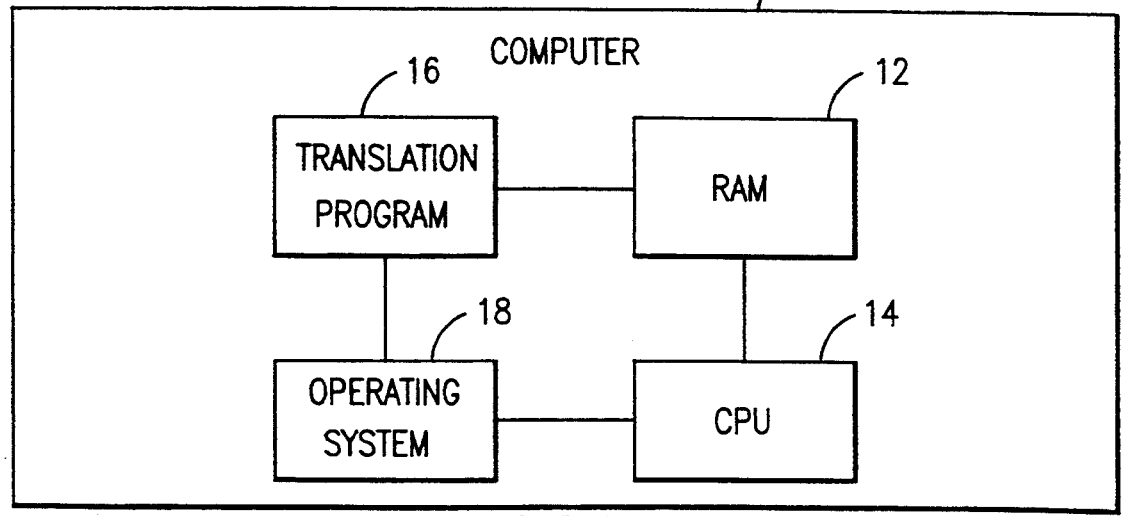
FIG. 4 shows another excerpt from the memory of the computer system of FIG. 1, listing different examples of words, word types, junction codes, position codes, transfer codes, and translations.
FIG. 5 shows a table in which the compositions of compounds in the German and the English language are compared with each other.
FIG. 6 shows a computer system which includes the memory of FIGS. 1-5 and implements the present invention.

FIG. 1 shows an excerpt from a memory 12 of a computer system 10 for text translation. Depicted is one line of the memory which is subdivided into seven columns. The first column serves to accommodate a word 100. This is followed by a column for the word type 101 and the semantic type 102 of the word 100, as well as a juncture code F 103, a position code P 104, and a transfer code T 105. Finally, the line also contains a translation 106 of the word 100.

The word 100 is a word of a source language, i.e. the language to be translated from. Translation 106 is a word of a target language, i.e. the language to be translated into. Word 100 of the source language and translation 106 of the target language are associated with each other, meaning they are semantically identical.

The actual length of the memory line shown in FIG. 1 depends in particular on the number of letters of the word 100 and the number of letters of the translation 106. In addition, the semantic type 102 and the transfer code 105 may comprise a different number of letters.

The word type 101 concerns the word 100. If the word 100 is, for example, a noun, this is stored by means of the word type 101 information "n" (noun) (see FIG. 4). In accordance with this, verbs or adjectives may be denoted by word type 101 information "v" or "a".

The semantic type 102 is a general item of information concerning the associated word 100. Examples of this are described below (see FIG. 4).

By means of the table of FIG. 2, the different juncture codes F 103 are explained in detail. The table has three columns, the first column containing the juncture code 103, the second column a definition 121 of the juncture code 103, and the third column an example 122 of the juncture code 103. The table of FIG. 2 concerns the German language.

The juncture code 103 denotes which letters are taken off or added to the respective word 100 when words 100 are combined to a compound. An "s", for example, is added to the word 100 "Heizung" when this word is used in the compound "Heizungsmonteur". The relevant juncture code 103 is "13", and the associated definition 121 "+s" denotes that an "s" is to be added to the word 100 "Heizung", as already mentioned. In the case of the juncture code 103 "17", the definition 121 "−en +s" indicates that when the word 100 "Weihnachten" is used in a compound, the letters "en" are deleted at the end and the letter "s" is added instead, such as in the compound "Weihnachtskonzert".

Twenty-seven such juncture codes 103 are listed in the table of FIG. 2. Additional juncture codes 103 may, of course, be provided.

By means of the table of FIG. 3, the position code P 104 is explained in detail below. The table has three columns, the first column containing the position code 104, the second column the definition 131 of the position code 104, and the third column examples 132 of this position code 104. The table of FIG. 3 concerns the German language. The table of FIG. 3 lists a total number of eight position codes 104.

Position code 104 indicates the positions at which a word may occur in a compound taking account of the juncture code 103. Thus, for instance, the word "Antritts" which is made up of the word 100 "Antritt" and the letter "s" according to the juncture code 103 "13" may occur on its own, such as in the meaning of "des Antritts", but also at any point in the compound, such as in the compound "Antrittsbesuch" or "des Probeantritts". This example includes, according to the table of FIG. 3, the position code 104 "1". The word "Oster" on the other hand, which is made up of the word 100 "Ostern" from which the letter "n" has been deleted according to the juncture code 103 "18" cannot occur on its own but only in a compound at the beginning or in the middle. This example is associated with the position code 104 "6".

If a compound is to be translated by the computer system, the computer system decomposes the compound in a first step into individual words 100. This is done by the computer system such that the compound to be translated, starting from its beginning, is compared in the memory letter by letter with the words 100 stored therein until a matching word 100 has been found. For this purpose, the word type 101 excludes, for instance, pronouns, conjunctions or the like and admits in particular only nouns, adjectives, verbs, and adverbs. This search compares not only the respective portion of the compound with words 100 but also with modified words 100 which are stored in response to the juncture code 103. In the compound "Volksbefragungskampagne", for example, this ensures that the words 100 "Volk", "Befragung" and "Kampagne" are successively found in the memory, with the associated juncture code 103, i.e., an additional "s", being considered for the words 100 "Volk" and "Befragung".

At the same time, this first step examines whether the position of the words 100 obtained in the compound to be translated corresponds to the position codes 104 stored for those words. If it does not, there may be an error which may be displayed or in response to which the search may be carried out a second time. If the stored position codes 104 correspond to the actual positions of the words 100 in the compound, these words 100 are used for further translation.

In the next step, the computer system reads the translations 106 associated with the words 100 from memory. These translations 106 have to be combined for a correct translation of the source language compound into the target language. For this purpose, translation aids are used which are explained below with reference to FIGS. 4 and 5.

In the excerpt from the memory of the computer system in FIG. 4, German is the source language and English the target language. A number of German words 100 are listed along with the respective word type 101, the semantic type 102 as well as the associated juncture code F 103, the position code P 104, the transfer code T 105, and the English translation 106.

For translating, for instance, the German compound "Parlamentsdebatte" into English, the computer system decomposes this compound, as previously explained, into the words 100 "Parlament" and "Debatte", utilizing the word type 101, the juncture code 103 and the position code 104. The respective translations 106, i.e., "parliament" and "debate", are read by the computer system from the memory means. In the absence of a transfer code 105, the computer system would only be capable of translating the compound "Parlamentsdebatte" on the basis of the two associated translations 106. As the correct translation of this compound is however "parliamentary debate", the computer system would supply the faulty translation "parliament debate" in such a case.

In the present example, the word 100 "Parlament" is accompanied by the transfer code 105 "adj". This transfer code 105 specifies that whenever the associated word 100 is used in a compound, it must be translated as an adjective. The word 100 "Parlament", provided it is used in a compound, must not be translated as a noun "parliament" but as an adjective "parliamentary".

Thus, transfer code 105 specifies how the associated word 100 in a compound is to be translated deviating from standard translation rules. If necessary, this deviating translation may be especially indicated. In the described example, the adjective translation of the word 100 "Parlament" is indicated by "adj:parliamentary" as a further translation 106. It is, of course, possible to replace the direct information "parliamentary" by a code or an address pointing to the word 100 "parlamentarisch" and thus to the translation 106 "parliamentary".

In another example, the German compound "Sicherheitsglas" is assumed to be translated into English. As previously described, the computer system decomposes this compound into the words 100 "Sicherheit" and "Glas", taking account of the word type 101, the juncture code 103, and the position code 104. For the word 100 "Sicherheit" there are two English translations 106, namely "safety" and "security". Without the transfer code 105 it would be impossible for the computer system to provide the correct translation of the compound, namely "safety glass".

The transfer code 105 "phys/abs" in the present example denotes that the translation of the associated word 100 "Sicherheit" in a compound depends on the semantic type 102 of the respective word or the other words of the compound. If these other words of the compound have a physical connotation, meaning that they consist in particular of matter, then the translation 106 "safety" is used for the word 100 "Sicherheit". If the other words of the compound are however used in an abstract, i.e. intellectual, sense, then the translation 106 "security" is used for the word 100 "Sicherheit" in the compound.

In the present example concerning the compound "Sicherheitsglas", the second word 100 "Glas" of the compound consists of matter and thus has physical characteristics within the meaning of transfer code 105. For the word 100 "Glas" this is specified by the semantic type 102 "phys".

Therefore, the translation 106 "safety" is used to translate the word 100 "Sicherheit" in that compound. In the memory, this translation 106 is associated with the word 100 "Sicherheit" followed by "phys". The alternative translation of the word 100 "Sicherheit" is also stored as translation 106 but followed by "abs".

On the basis of the semantic type 102 "phys" associated with the word 100 "Glas", the computer system in the present example uses the correct translation for the compound "Sicherheitsglas", namely "safety glass".

Transfer code 105 thus allows considering translation peculiarities of words 100 in conjunction with compounds. There are various peculiarities which may be stored in the form of the transfer code 105 and in response to which the translation process proceeds in a special way. This may be done in the form of routines which are capable of accessing the translations 106 and selecting, for example, between the different alternatives stored therein. The two previously described transfer codes "adj" and "phys/abs" are only examples of contexts in which other word types or constructions occur, as, for instance, with prepositions or the like, and are not intended to limit the scope of the present invention in any way. Transfer codes 105, whose range of application is arbitrarily extendible, differ from one language to the other.

It is also possible to store no transfer code 105 for a word 100 in the memory. This implies that the respective word 100 in the compound is translated to standard rules. Some translation rules are particularly significant and are described below with reference to FIG. 5.

FIG. 5 shows the composition of German compounds and the associated English translations. It is assumed that the compounds consist in each case of two words 100, as they generally do. The English translations are arranged in the order in which they are most likely to occur. Counts have shown that compounds consisting of two nouns in German translate into English as two nouns in the majority of cases. It has also been found that compounds consisting of an adjective and a noun in German are identically structured in English in most cases. Finally, it has been found that, deviating from previous similar translation attempts, compounds composed of a verb and a noun in German translate into English compounds with two nouns in the majority of cases. The likelihood of additional compositions occurring is rather limited.

If no transfer code 105 is specified for a word 100 of a compound, the computer system tests whether the compound consists of two nouns. If it does, the computer system uses translations 106 which also consist of two nouns. The computer system proceeds analogously according to table 5 if the compound consists of an adjective and a noun or of a verb and a noun.

If, on the other hand, as a result of several transfer codes 105, there are differently composed translations 106 for a particular compound, the computer selects that compound which according to FIG. 5 is most likely to occur.

The table of FIG. 5 may be stored in the memory of the computer system but it is also possible to use routines to specify the various associations. A table may also be prepared and stored for compositions of more than two words 100.

The memory of the computer system stores all the words 100 of the source language along with the associated word type 101, the associated semantic type 102, as well as the respective juncture code 103, the position code 104, the transfer code 105, and the translation 106 into the target language. The memory of the computer system thus contains an electronic lexicon from the source into the target language.

With the described text translation system it is not necessary to store compounds of the source language in the memory of the computer system, unless such compounds are lexicalized, as, for instance, the word "Gebaermutter" or the like. Any other compounds are decomposed into the words 100 of which they consist. Decomposition into the words 100 is achieved by means of the juncture code 103 and the position code 104. Translation peculiarities of these words 100 in compounds are considered by means of the transfer code 105.

Thus, the memory space required for storing the electronic lexicon is relatively small. Because of its small size, the memory may be searched in a relatively short time. In view of this, the described translation system may also be stored in small computer systems. Finally, the text translation system may be designed and used for any arbitrarily selected source and target languages.

FIG. 6 illustrates the computer system 10. Computer system 10 comprises a RAM 12 for storing all of the data and tables illustrated in FIGS. 1-5, a CPU 14, a translation program 16 which perform all of the translation functions described above, and an operating system 18 which controls execution of the translation program. The translation functions performed by CPU 14 and translation program 16 include determining which constituent words constitute each compound word, the translations of these constituent words, and the appropriate grammatical form of the translated constituent words, and combining the translations of the constituent words to form the translation of the compound word.

We claim:

1. A computer implemented method for translating an unhyphenated compound word from a source language to a target language, said method comprising the steps of:

storing in a memory a multiplicity of constituent words in the source language and translations of said constituent words into the target language;

comparing the constituent words in memory to a plurality of different beginning segments of the compound word and identifying one of said constituent words which matches one of said segments;

fetching from said memory and combining translations of said one constituent word and another constituent word that follows said one constituent word in said compound word.

2. A method as set forth in claim 1 further comprising the steps of:

storing in said memory an indication of which letter(s) are added to or deleted from a constituent word when the constituent word is combined with another constituent word in the compound word; and using said indication to determine which constituent words constitute the compound word.

3. A method as set forth in claim 1 further comprising the steps of:

storing in said memory indications of appropriate grammatical forms for the translations of the constituent words based on a position of each of said constituent words relative to another constituent word of the same compound word or based on a grammatical form of this other constituent word of the same compound word; and using said indications to determine the translations of the constituent words of the compound word.

4. A method as set forth in claim 1 further comprising the steps of:

storing in said memory indications of appropriate grammatical forms for the translation of constituent words based on a grammatical form of all of the constituent words in the compound word in the source language; and using said indications to determine the translations of the constituent words of the compound word.

5. A method as set forth in claim 4 further comprising the steps of:

storing in said memory an indication that when the grammatical form of two successive constituent words of a compound word of a German source language are verb and noun, respectively then the grammatical form for the translations of the two successive constituent words is noun and noun, respectively; and using said indication to determine the translations of the two constituent words.

6. A method as set forth in claim 1 further comprising the steps of:

storing in said memory more than one translation for the same constituent word;

storing in said memory an indication of which translation for the same constituent word is appropriate based on a semantic type of another constituent word of the same compound word; and using said indication to determine the translation of the compound word.

7. A computer system for translating an unhyphenated compound word from a source language to a target language, said system comprising:

memory means for storing a multiplicity of constituent words in said source language, and translations of said constituent words into said target language;

means for comparing the constituent words in memory to a plurality of different beginning segments of the compound word and identifying one of said constituent words which matches one of said segments; and means for fetching from said memory and combining translations of said one constituent word and another constituent word which follows said one constituent word in said compound word.

8. A method as set forth in claim 1 wherein said plurality of different beginning segments comprise a beginning segment of n letters and a beginning segment of n+1 letters.

9. A method as set forth in claim 1 wherein said plurality of different beginning segments are selected by first selecting a beginning segment of n letters, then selecting a beginning segment of n+1 letter and then selecting a beginning segment of n+2 letters, etc. until one of said constituent words matches one of said segments.

10. A method as set forth in claim 1 wherein said storing, comparing, fetching and combining steps are performed by a computer.

11. A computer implemented method for translating compound words from a source language to a target language, said method comprising the steps of:

storing in a memory a multiplicity of constituent words in the source language, an indication of which letter(s) are added to or deleted from a constituent word when the constituent word is combined with another constituent word in the compound word, and translations of said constituent words into the target language; using said indication, identifying from the memory the constituent words that correspond to the compound word; and fetching from said memory and combining the translations of said constituent words.

12. A computer implemented method for translating compound words from a source language to a target language, said method comprising the steps of:

storing in a memory a multiplicity of constituent words in the source language, translations of said constituent words into the target language, and information that when the grammatical form of two successive constituent words of a compound word of a German source language are verb and noun, respectively, then the grammatical form for the translations of the two successive constituent words is noun and noun, respectively;

identifying from said memory a plurality of constituent words which form said compound word; and using said information, determining the proper grammatical form of the translations of said constituent words.

13. A computer implemented method for translating compound words from a source language to a target language, said method comprising the steps of:

storing in a memory a multiplicity of constituent words in the source language, translations of said constituent words into the target language, said translations including more than one translation for the same constituent word, and an indication which translation for the same constituent word is appropriate based on a semantic type of another constituent word of the same compound word; and identifying from said memory a plurality of constituent words which form said compound word, said plurality including the constituent word which has two translations; and using said indication to determine the proper translation for the constituent word which has two translations.

14. A method as set forth in claim 13 wherein one of said semantic types is physical.

* * * * *